US007757964B2

(12) United States Patent
Hansson

(10) Patent No.: US 7,757,964 B2
(45) Date of Patent: Jul. 20, 2010

(54) AIR CAP

(75) Inventor: Birger Hansson, Åkarp (SE)

(73) Assignee: Baldwin Jimek AB, Arlov (SE)

( * ) Notice: Subject to any disclaimer, the term of this patent is extended or adjusted under 35 U.S.C. 154(b) by 149 days.

(21) Appl. No.: 10/560,402

(22) PCT Filed: Jun. 8, 2004

(86) PCT No.: PCT/SE2004/000889

§ 371 (c)(1),
(2), (4) Date: Feb. 6, 2007

(87) PCT Pub. No.: WO2005/000583

PCT Pub. Date: Jan. 6, 2005

(65) Prior Publication Data

US 2008/0017733 A1 Jan. 24, 2008

(30) Foreign Application Priority Data

Jun. 30, 2003 (SE) .................................... 0301921

(51) Int. Cl.

| | |
|---|---|
| ***B05B 15/02*** | (2006.01) |
| *F23D 11/10* | (2006.01) |
| *B05B 7/06* | (2006.01) |
| *B05B 7/12* | (2006.01) |
| *F23D 11/16* | (2006.01) |
| *B05B 7/10* | (2006.01) |
| *B05B 1/34* | (2006.01) |
| *B05B 1/00* | (2006.01) |
| *B05B 1/28* | (2006.01) |
| *B05B 1/26* | (2006.01) |
| *F16L 55/00* | (2006.01) |
| *F16L 55/027* | (2006.01) |
| *G01F 1/42* | (2006.01) |

(52) U.S. Cl. .................... 239/110; 239/416.5; 239/600; 239/589; 239/432; 239/548; 239/423; 239/424; 239/417.3; 239/416.4; 239/403; 239/419.3; 239/468; 239/470; 239/482; 239/424.5; 239/425; 239/270; 239/290; 239/543; 239/544; 138/104; 138/42; 138/44

(58) Field of Classification Search ................. 239/110, 239/416.5, 600, 601, 589, 432, 548, 423, 239/424, 417.3, 416.4, 403, 419.3, 468, 470, 239/482, 424.5, 425, 270, 290–301, 543, 239/544; 138/104, 42, 44
See application file for complete search history.

(56) References Cited

U.S. PATENT DOCUMENTS 2,753,219 A * 7/1956 Matarese .................... 239/456

(Continued)

FOREIGN PATENT DOCUMENTS

EP 0 904 842 A2 3/1999

(Continued)

*Primary Examiner*—Dinh Q Nguyen
*Assistant Examiner*—Steven Cernoch
(74) *Attorney, Agent, or Firm*—Merchant & Gould P.C.

(57) ABSTRACT

An air cap for keeping a spray nozzle with a flat spray clean is presented. The air cap contain the nozzle and has a slit for the spray from the nozzle, through which opening an air flow is flowing in the same direction as the flat spray from the nozzle. The air cap is divided into a back component comprising an internal thread, and a front component comprising the slit. The components are rotatable relative to one another.

6 Claims, 8 Drawing Sheets

U.S. PATENT DOCUMENTS 2,905,196 A * 9/1959 Wagenen et al. ......... 137/625.2
3,078,047 A * 2/1963 Encmark .................... 239/405
4,236,674 A 12/1980 Dixon
4,418,723 A * 12/1983 Koni et al. .................... 138/42
4,502,629 A 3/1985 McGhee et al.
4,570,858 A * 2/1986 Bintner et al. .............. 239/390
4,615,359 A * 10/1986 Affa et al. ................... 138/104
4,625,916 A * 12/1986 Nieuwkamp et al. ........ 239/431
5,048,572 A * 9/1991 Levine ....................... 138/121
5,348,230 A * 9/1994 Mullen et al. ............... 239/428
5,456,414 A 10/1995 Burns et al.
5,595,116 A 1/1997 Ohkawara
5,673,859 A * 10/1997 Haruch ....................... 239/568
5,727,739 A * 3/1998 Hamilton .................... 239/600
5,732,885 A * 3/1998 Huffman ................. 239/416.5
5,813,608 A * 9/1998 Yoshioka et al. ............ 239/110
5,829,682 A * 11/1998 Haruch ....................... 239/419
5,848,750 A 12/1998 Schwab
5,881,958 A 3/1999 Asakawa et al.
5,899,387 A * 5/1999 Haruch ....................... 239/296
5,921,472 A * 7/1999 Haruch ....................... 239/432
5,922,131 A * 7/1999 Haas .......................... 118/629
6,010,329 A * 1/2000 Zagoroff ..................... 431/158
6,036,109 A * 3/2000 DeYoung .................... 239/301
6,042,263 A * 3/2000 Mentzer et al. ............. 366/340
6,076,744 A * 6/2000 O'Brien ...................... 239/110
6,142,388 A * 11/2000 Schwab ...................... 239/405
6,244,527 B1 * 6/2001 Ferrazza et al. ............. 239/600
6,267,301 B1 * 7/2001 Haruch ....................... 239/290
6,318,642 B1 * 11/2001 Goenka et al. ................. 239/8
6,669,115 B2 * 12/2003 Sun et al. .................... 239/403
6,997,405 B2 * 2/2006 Haruch ....................... 239/690
2003/0057302 A1 * 3/2003 Swan ......................... 239/597
2003/0146301 A1 * 8/2003 Sun et al. .................... 239/399

FOREIGN PATENT DOCUMENTS

GB 1118464 7/1968
JP 05106779 A * 4/1993

* cited by examiner

AIR CAP

FIELD OF THE INVENTION

The present invention relates to an air cap for keeping a spray nozzle clean, the air cap comprising an interior volume and an opening for the spray, through which opening a small air flow is flowing.

PRIOR ART

Spray devices for spraying fountain solution on a web in a printing machine are known e.g. from U.S. Pat. No. 5,595,116.

It is a well-known fact that spray nozzles used on such devices tend to get clogged due to impurities in the air in the vicinity of the printing machine, which build up close to the nozzle opening. In order to minimise the problem with nozzle clogging, several different air caps have been used to protect the nozzle from negative influences of impurities in the air. Such an air caps has an opening for the spray. Low-pressure air is directed through the opening, in the same direction as the spray, which gives the spray nozzle a clean environment to work in.

One severe problem for the spray nozzle caps according to the prior art is that it is difficult to position the opening in the cap in a correct manner with respect to the spray from the nozzle. This problem is particularly severe for "fan-spray" type nozzles, i.e. for flat sprays. One way of solving this problem is to use a bayonet mount for the air cap. With bayonet mounts, the turning angle for the mounting is fixed. One problem with the bayonet mount is that existing spray nozzles, without air caps, can not be retrofitted with bayonet mount air caps.

On most existing spray nozzles, the nozzle is held in place by means of a mounting component comprising a shoulder contacting the nozzle, and a thread means that is used to mount the mounting component on a nozzle holder. Unfortunately, it has up till now been impossible to provide this type of holders with caps, since the angle the threads must be turned until a firm hold has been achieved varies, which gives an uncertainty regarding the positioning of the spray opening with respect to the nozzle. Also, it has been very difficult to provide the cap with the necessary airflow.

SUMMARY OF THE INVENTION

The present invention solves the above mentioned problems by means of a device according to claim 1. Preferred embodiments are described in the dependent claims.

BRIEF DESCRIPTIONS OF THE DRAWINGS

In the following, the invention will be described by means of an embodiment, with reference to the attached drawings, wherein FIG. 1 is a front perspective view of an assembled rotatable air cap according to the present invention;

DESCRIPTION OF AN EMBODIMENT

Figure 1:
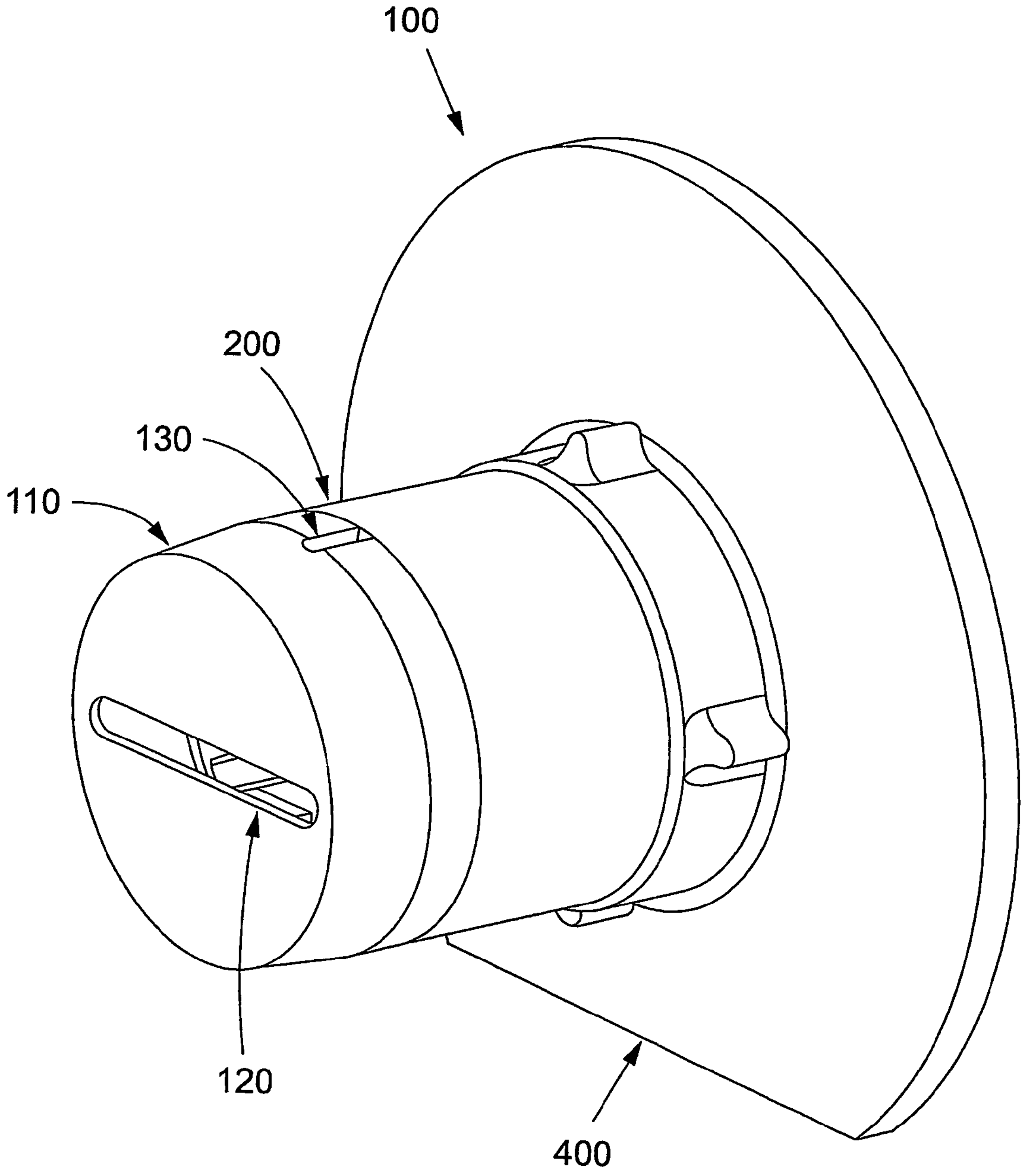

FIG. 1 shows a rotatable air cap 100 for holding a spray nozzle 300 clean, comprising a front component 110 and a back component 200. A flexible washer 400 is squeezed between the back component 200 and a spray beam (not shown). The front component 110 is rotatable around a centre axis (not shown) on a front portion of the back component 200. Further, a slit 120 on the front portion of the front component and a drainage hole 130 are shown. A similar drainage hole 130 is located under the front component 110.

Figure 2:
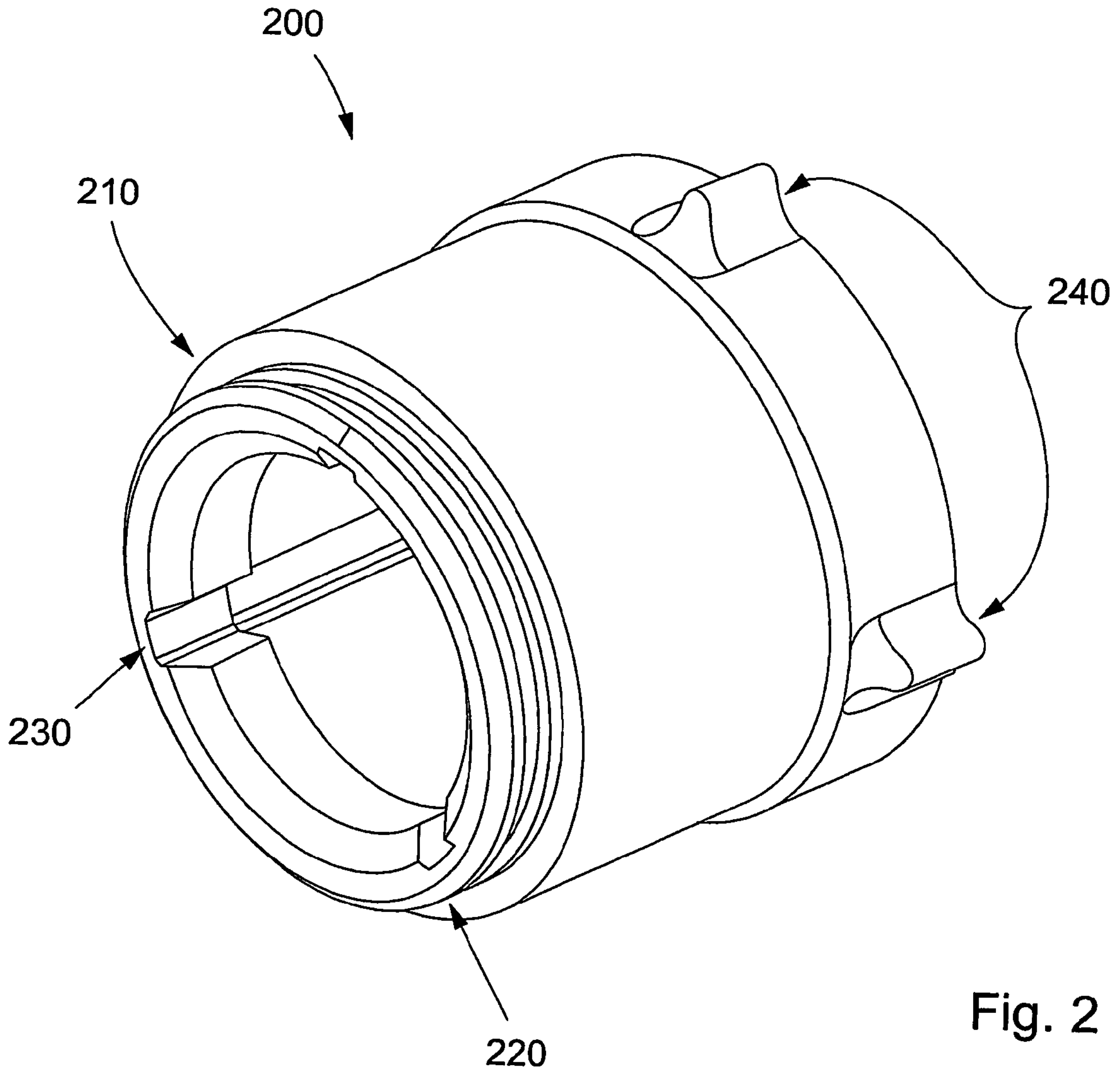
FIG. 2 is a front perspective view of a back component of the rotatable air cap of FIG. 1.

FIG. 2 shows the back component 200. The front portion of the back component 200 comprises a sliding surface 210, a circular shoulder 220, and air recesses 230. On the back portion of the back component, handles 240 for manual turning of the back component 200 are provided to facilitate tightening of the back component.

Figure 3:
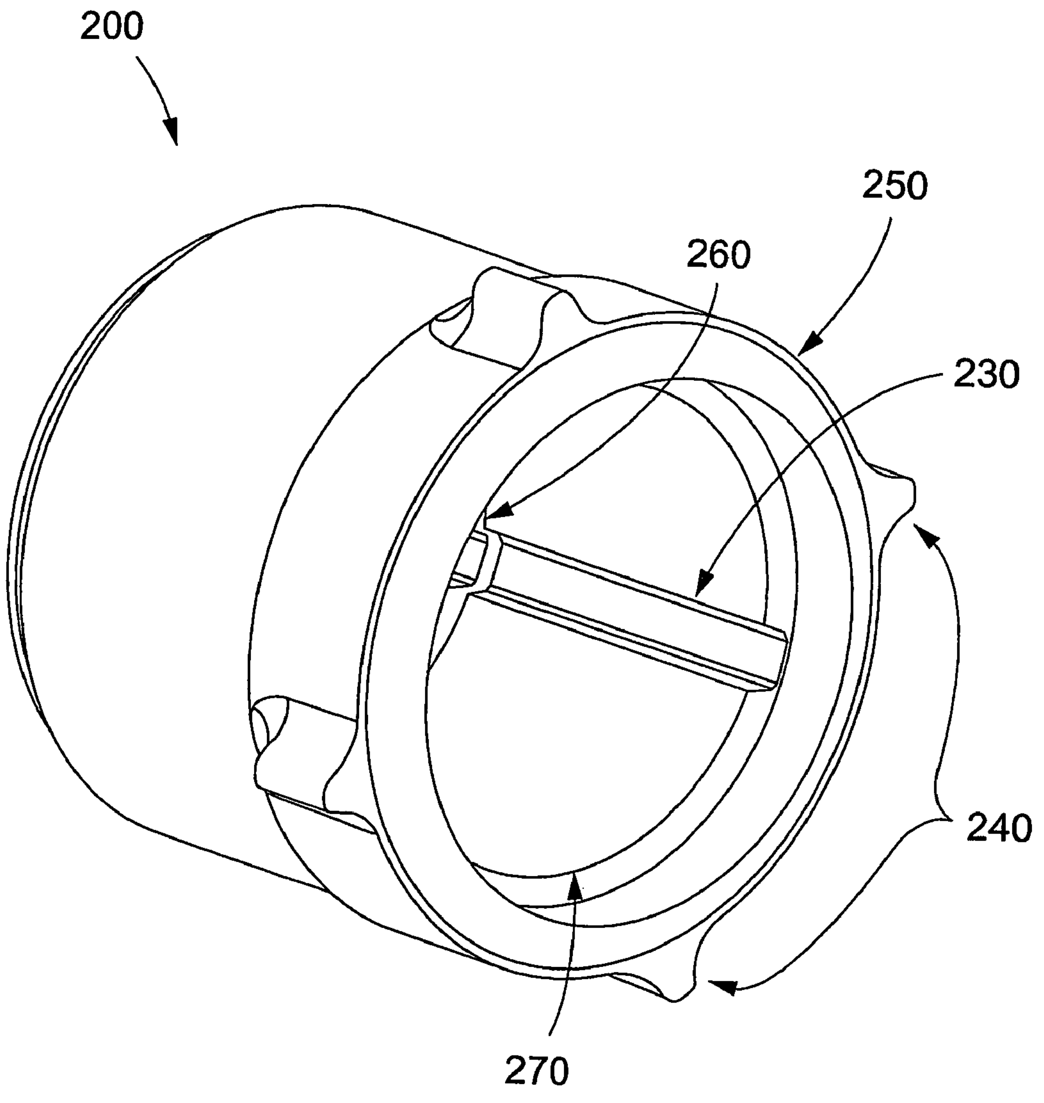
FIG. 3 is a rear perspective view of the back component of the rotatable air cap of FIG. 1.

FIG. 3 is a rear perspective view of the back component 200, showing the handles 240, an air sealing surface 250, and an internal thread 270, which is provided with the air recesses 230 of FIG. 2. Further, the back component comprises a holding surface 260, which co-acts with a surface on the spray nozzle 300, for holding the nozzle.

Figure 4:
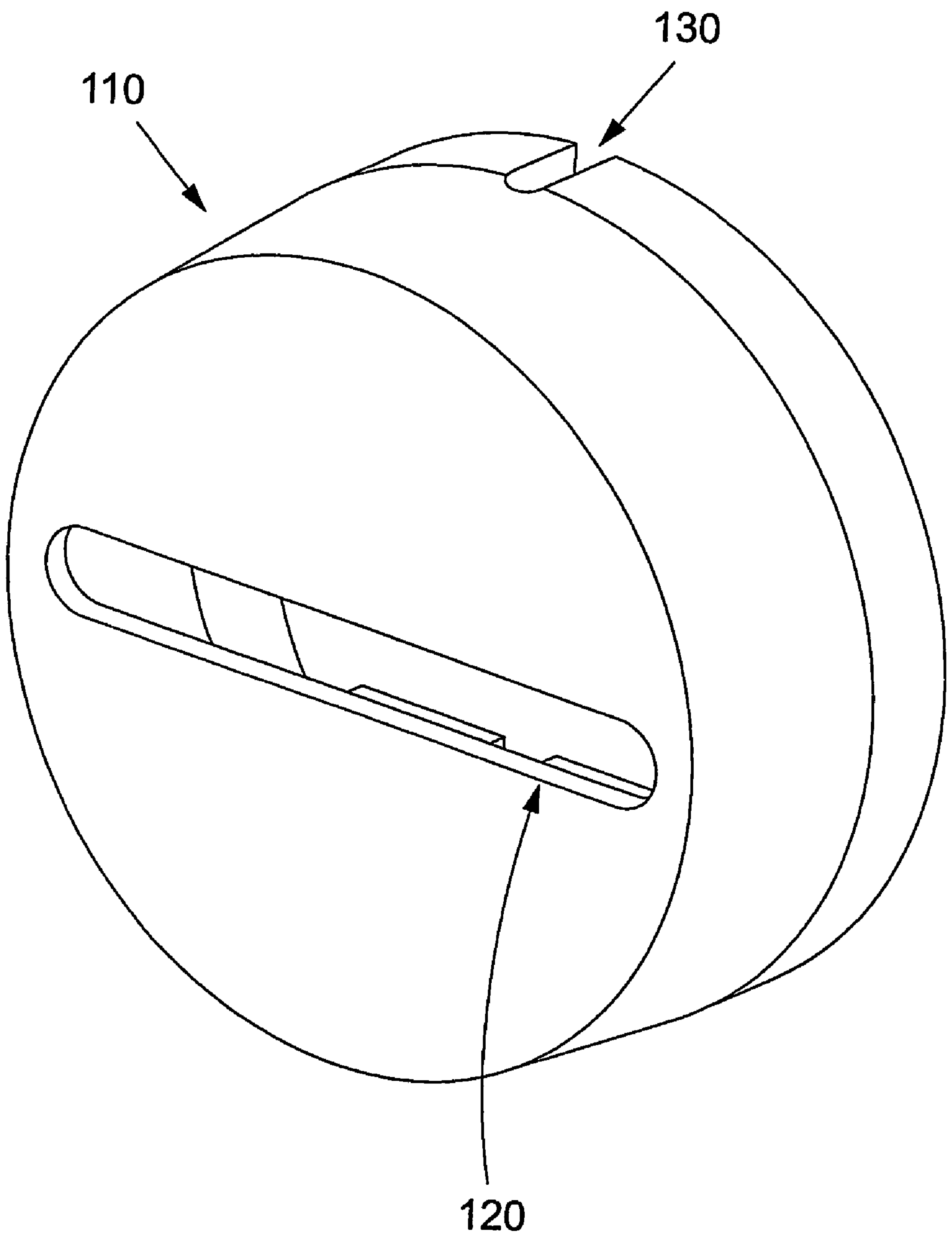
FIG. 4 is a front perspective view of a front component of the rotatable air cap of FIG. 1.
Figure 5:
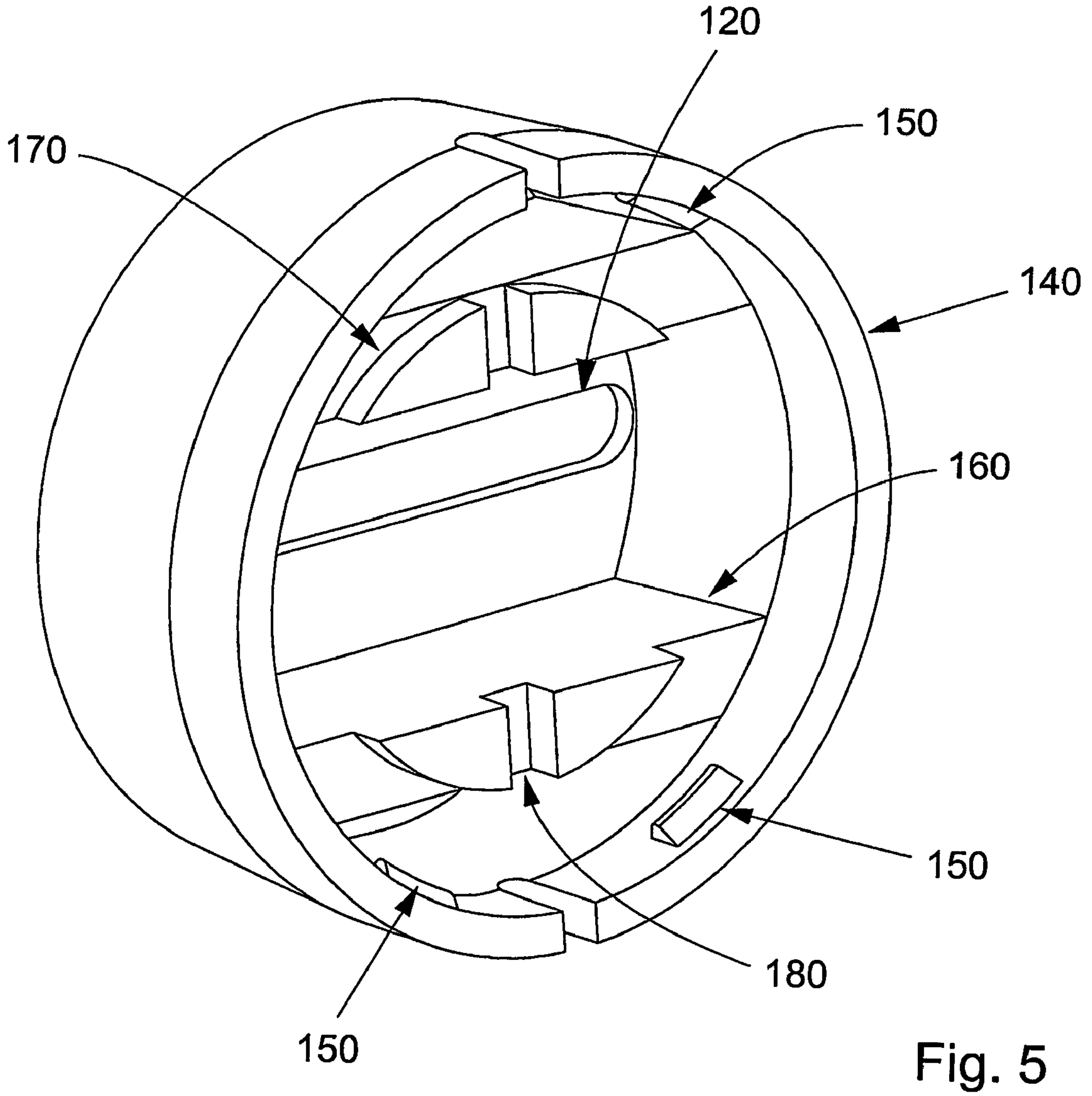
FIG. 5 is a rear perspective view of the front component of the rotatable air cap of FIG. 1.

FIGS. 4 and 5 are front and rear perspective views, respectively, showing the front component 110, comprising the drainage holes 130, a sliding surface 140 on the back portion of the front component, shoulders 150, guiding surfaces 160, the slit 120 on the front portion of the front component, and guiding portions 170. The guiding portions 170 are provided with second drainage holes 180.

Figure 6:
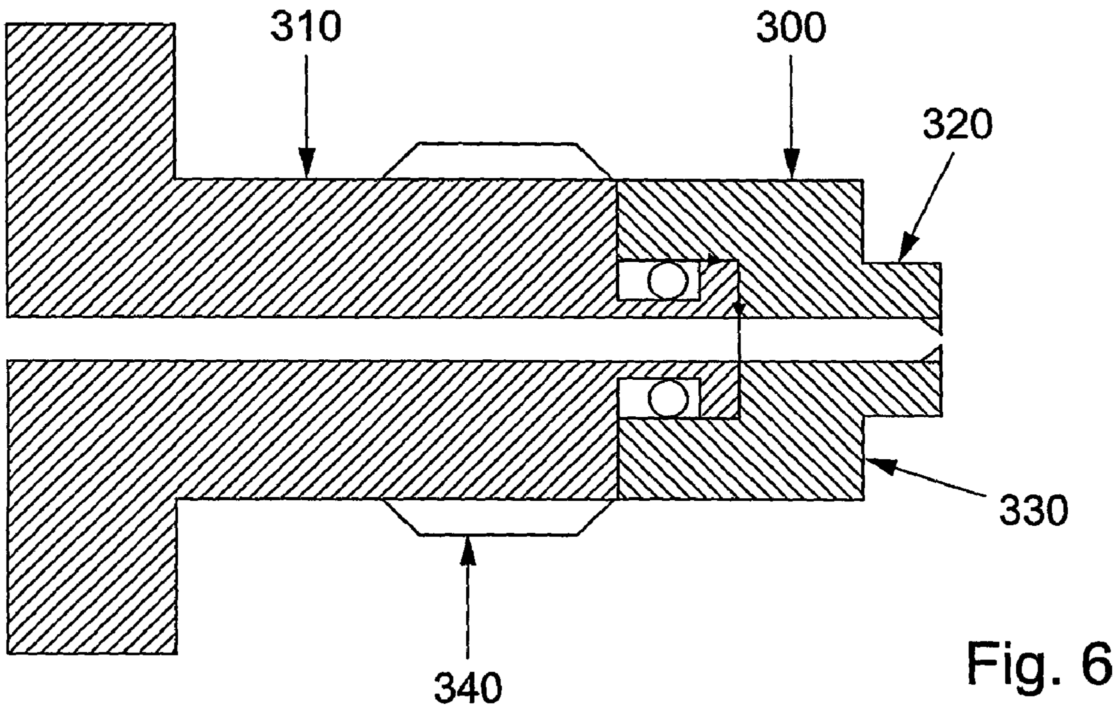
FIG. 6 is a sectional side view of a prior art nozzle and a nozzle holder that can be retrofitted with the air cap according to the present invention.

FIG. 6 shows a prior art spray nozzle 300 and its holder 310. As can be seen, the spray nozzle 300 comprises guiding surfaces 320, which co-act with the guiding surfaces 160 on the front component 110, and a retaining surface 330, that interacts with the holding surface 260 of the back component 200. Further, external threads 340 for co-operation with the internal threads 270 on the back component 200 are provided on the holder 310.

Figure 7:
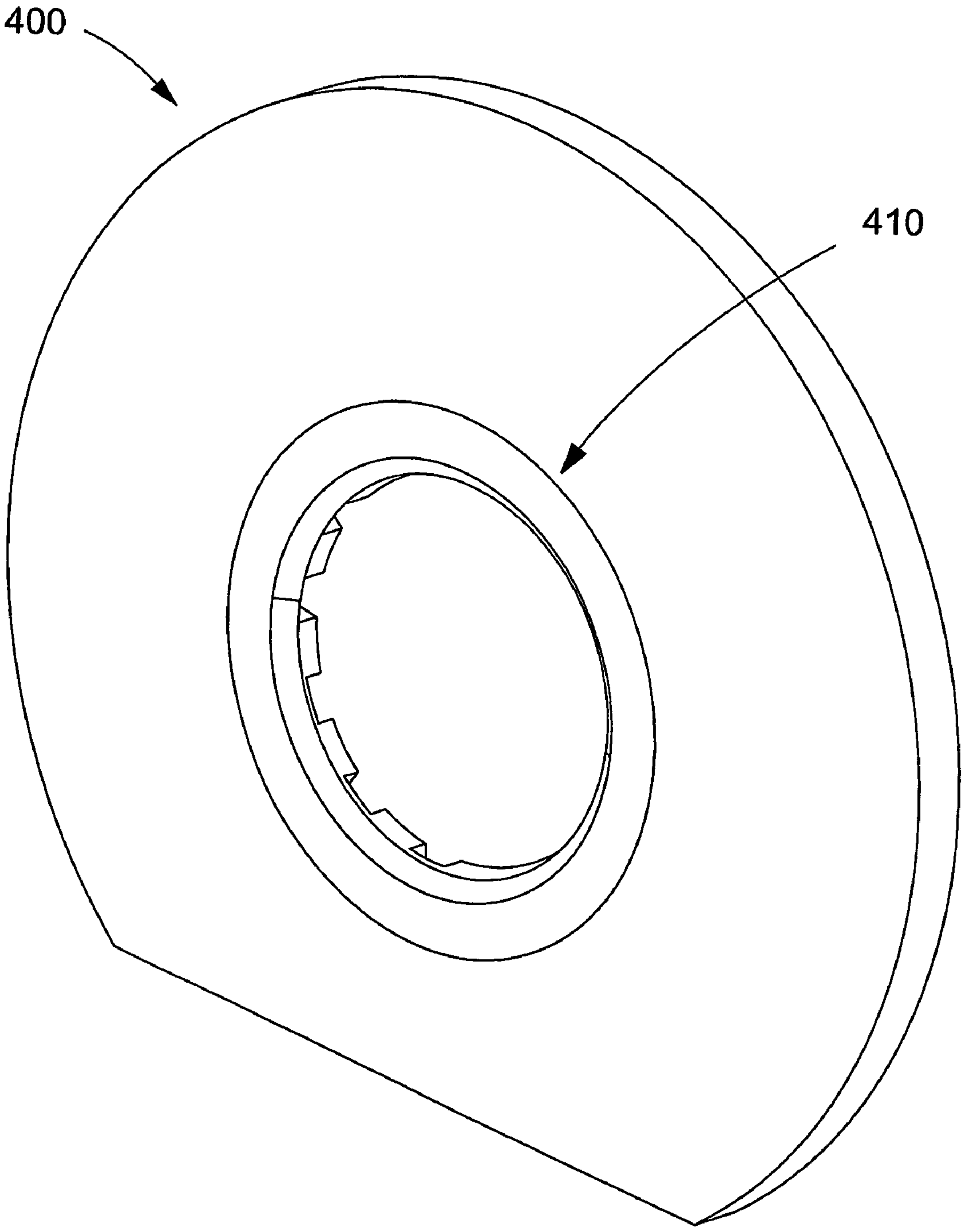
FIG. 7 is a front perspective view of a flexible washer of the rotatable air cap of FIG. 1.
Figure 8:
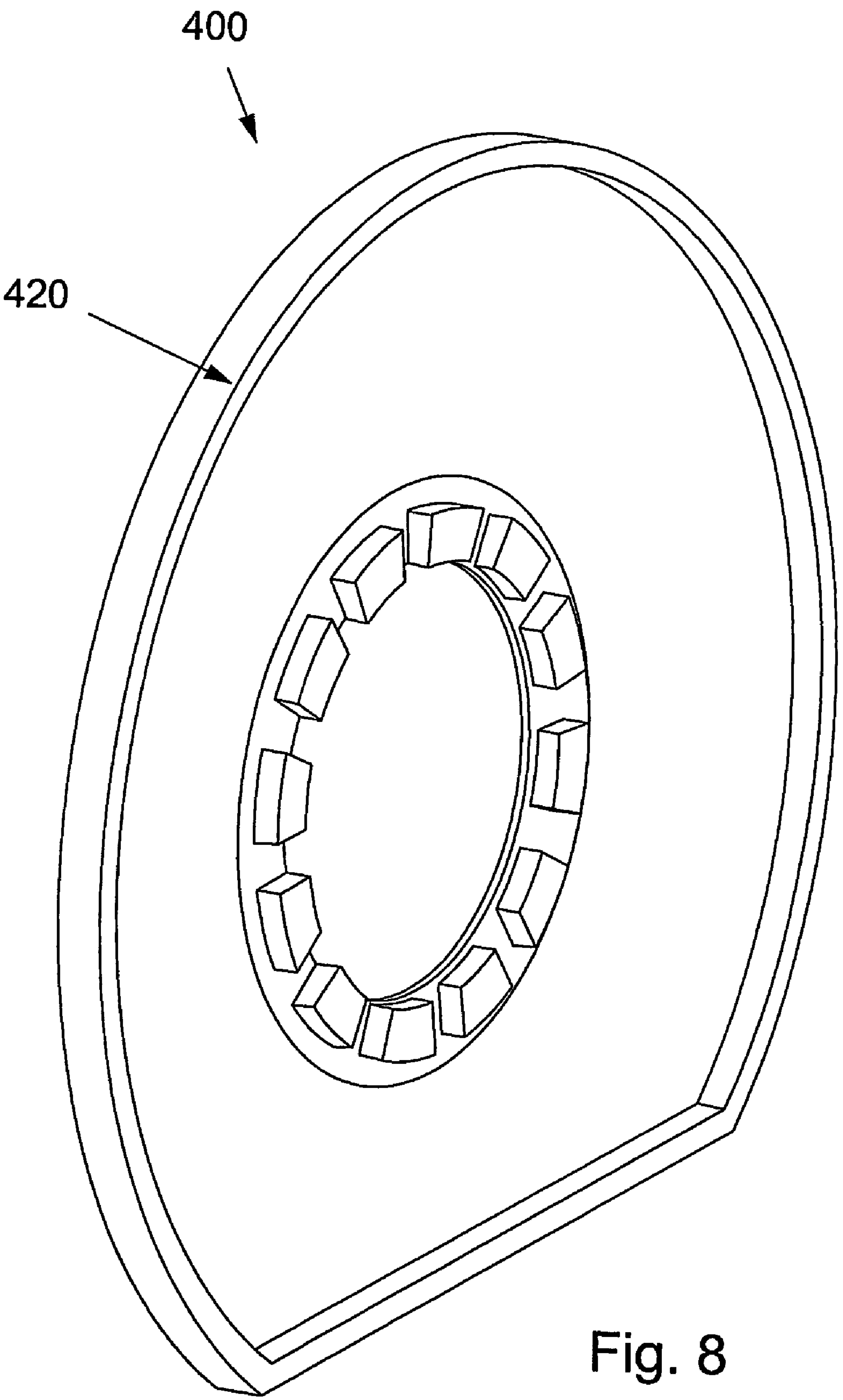
FIG. 8 is a rear perspective view of the flexible washer of FIG. 7.

FIGS. 7 and 8 show a flexible conical washer 400, with a front sealing surface 410 and a back sealing surface 420. The function of the conical shape of the washer 400 will be described later.

In the following, the function of the rotatable air cap will be described.

First, the air cap must be assembled. This can be done before the air cap is sold to a customer by pressing the back portion of the front component towards the front portion of the back component. A certain pressure will cause the shoulders 150 of the back portion of the front component to "click" over the circular shoulder 220 of the front portion of the back component. After the "clicking" of the shoulder 150 over the circular shoulder 220, the sliding surfaces 140 and 210 of the front and back components, respectively, will engage and thus provide an air seal between the back and front components. Simultaneously, the sliding surfaces will be able to slide relative one another, which make it possible to rotate the front and back component relative one another.

When mounting the rotatable air cap on the nozzle, by engaging the internal threads 270 on the back component 200 and the external threads 340 on the holder 310, the guiding surfaces 160 on the front component and the guiding surfaces 320 on the nozzle 300 will engage, making it impossible to rotate the front component 110 with respect to the nozzle 300. This means that it is possible to position the slit 120 correctly with respect to the guiding surfaces 160, 320 of the front component and the nozzle 300, respectively.

The threading of the back component 200 onto the threads 340 of the holder 310 also provides an engagement between the holding surface 260 of the back component 200 and the retaining surface 330 of the nozzle 300. This engagement holds the nozzle 300 fixed on the holder 310.

Finally, the air supply to the air cap will be described. As mentioned, it is crucial that air is flowing through the slit 120 in the same direction as the spray. This air must be provided to the back portion of the back component, from where it will flow towards the slit in the front component 110 through the air recesses 230 that are provided in the back component 200. In one embodiment, the air is provided through the flexible washer 400, which is squeezed between the back component 200 and a spray beam (not shown) with a flat front surface, in which spray beam the nozzle holders are mounted. In the spray beam, a small air hole is drilled for each nozzle holder, inside the inner periphery of the back sealing surface 420 of each washer 400 mounted to the spray beam. The air holes are connected to some kind of air feed system. Due to the conical shape of the flexible washer 400, its function becomes two-folded:

1. The conical shape gives a space between the washer 400 and the spray beam, through which space air provided through the air hole in the spray beam is led into the air recesses 230 in the back component.
2. The conical shape gives a resilience to the washer 400, making it possible to get a proper sealing between the spray beam and the washer, and between the washer and the back component, even if the fit between the parts is not perfect.

All the above-described components, except the nozzle 300, are preferably manufactured from plastic. One preferred plastic material is polypropylene, but all kind of plastics could be used. The nozzle is preferably made of stainless steel or the like.

It should be noted that the above description of an embodiment should not be limiting for the scope of the invention. The scope of the invention is defined by the appended claims.

The invention claimed is:

1. An air cap for keeping a spray nozzle that produces a flat spray clean, said air cap comprising a single slit and an interior volume adapted to at least partially contain the nozzle, the air cap being adapted to allow the flat spray from the nozzle, and an air flow flowing in the same direction as the flat spray, to flow through the interior volume and the single slit of the air cap, wherein the air cap is divided into a back component, wherein the back component comprises an internal thread for holding the nozzle and a front component comprising the single slit, guiding portions, and at least one drainage hole, wherein the front component and the back component are rotatable relative to one another via sliding surfaces and wherein the guiding portions comprise flat guiding surfaces constructed to co-act with guiding surfaces on the nozzle to keep the single slit in the front component aligned with the flat spray from the nozzle by preventing the front component guiding surface from being rotatable relative to the nozzle guiding surface, wherein at least one air recess is provided in the internal thread of the back component as well as in the interior wall of the sliding surface, wherein the air recess comprises a slot in the interior wall of the back component that is the length of the back component.

2. The air cap according to claim 1, wherein the back component is provided with handles for manual tightening of the back component.

3. The air cap according to claim 1, wherein a flexible washer is used to provide a sealed fit between a spray beam and the back component.

4. The air cap according to claim 1, wherein the front and back components are connected by means of a snap connection comprising at least one shoulder on the front component and a circular shoulder on the back component.

5. The air cap according to claim 1, wherein the guiding portions comprise second drainage holes.

6. An air cap assembly for keeping a spray nozzle clean comprising: an air cap defining an interior volume, the air cap comprising, a front component having flat guiding surfaces and a single slit, a back component that is rotatably connected to the front component via sliding surfaces, and a drainage hole; a spray nozzle that produces a flat spray, the spray nozzle having flat guiding surfaces and being at least partially contained within the interior volume of the air cap; wherein the back component secures the air cap to the nozzle, wherein the back component comprises an internal thread for holding the nozzle and wherein the flat guiding surfaces of the front component co-act with the flat guiding surfaces on the nozzle to align the single slit with the flat spray from the nozzle and co-act to prevent the front component from rotating relative to the nozzle, wherein at least one air recess is provided in the internal thread of the back component as well as in the interior wall of the sliding surface, wherein the air recess comprises a slot in the interior wall of the back component that is the length of the back component.

* * * * *